(12) United States Patent
Barz

(10) Patent No.: US 7,285,213 B2
(45) Date of Patent: Oct. 23, 2007

(54) CONVEYING UNIT

(75) Inventor: Torsten Barz, Maintal-Wachenbuchen (DE)

(73) Assignee: Siemens Aktiengesellschaft, Munich (DE)

( * ) Notice: Subject to any disclaimer, the term of this patent is extended or adjusted under 35 U.S.C. 154(b) by 250 days.

(21) Appl. No.: 11/072,800

(22) Filed: Mar. 2, 2005

(65) Prior Publication Data

US 2005/0194306 A1   Sep. 8, 2005

(30) Foreign Application Priority Data

Mar. 3, 2004  (DE) .................... 10 2004 010 357

(51) Int. Cl.
*F02M 37/02* (2006.01)
*B01D 35/027* (2006.01)
(52) U.S. Cl. ................... 210/416.4; 210/314
(58) Field of Classification Search ............. 210/416.1, 210/416.4, 314
See application file for complete search history.

(56) References Cited

U.S. PATENT DOCUMENTS

| | | | |
|---|---|---|---|
| 5,699,773 A | 12/1997 | Kleppner et al. | |
| 5,776,341 A * | 7/1998 | Barnard et al. | 210/306 |
| 6,170,472 B1 | 1/2001 | Gaston et al. | |
| 6,551,509 B2* | 4/2003 | Appleton | 210/416.4 |
| 6,672,288 B1* | 1/2004 | Schelhas et al. | 123/509 |
| 2002/0153300 A1* | 10/2002 | Appleton | 210/416.4 |
| 2003/0042185 A1* | 3/2003 | Dockery | 210/132 |
| 2006/0180535 A1* | 8/2006 | Yu et al. | 210/172 |

FOREIGN PATENT DOCUMENTS

| | | |
|---|---|---|
| DE | 198 34 653 C1 | 12/1999 |
| EP | 0 775 061 B1 | 5/1997 |
| EP | 0822331 * | 2/1998 |
| GB | 2 271 327 A | 4/1994 |
| WO | WO 96/41727 C2 | 12/1996 |

* cited by examiner

*Primary Examiner*—Fred G. Prince
(74) *Attorney, Agent, or Firm*—Hanley, Flight & Zimmerman, LLC

(57) ABSTRACT

The subject of the invention is a conveying unit (2) with a baffle (5), with a fuel pump (6) arranged therein and with a filter (14) which is arranged at the bottom (7) of the baffle (5) and which precedes an inlet orifice (8) arranged at the bottom (7) of the baffle (5). On that side of the baffle (5) which faces the tank bottom (9), ducts (11) are arranged, which are designed in such a way that fuel can flow from the circumference of the baffle (5) to the inlet orifice (8), and that shaped elements (13) forming filters (14) are arranged in the ducts (11).

11 Claims, 4 Drawing Sheets

CONVEYING UNIT

BACKGROUND OF THE INVENTION

The subject of the invention is a conveying unit with a baffle, with a fuel pump arranged therein and with a filter which is arranged at the bottom of the baffle and which precedes an inlet orifice arranged at the bottom of the baffle. The conveying unit serves for the conveyance of fuel out of a fuel tank to an internal combustion engine of a motor vehicle.

It is known to use conveying units of this type in fuel tanks. Impurities contained in the fuel may enter the fuel pump and damage this. In order to protect the fuel pump from these impurities, the fuel sucked in by the fuel pump is filtered. For this purpose, the fuel pump is preceded by a coarse filter, in order to keep the particles which could result in damage to the fuel pump away from the suction-intake region of the fuel pump.

The filters known for this purpose are separate components which are mounted on the bottom of the baffle, so that, even when the filling level in the fuel tank is low, the filter is located in the fuel. An appropriately small mesh width of the filter fabric ensures that the entire surface of the filter is wetted with fuel, even when the filter penetrates only partially into the fuel. Since the filter is mounted under the bottom of the conveying unit, the construction space necessary in the axial direction for the conveying unit is increased to a considerable extent. Since present-day fuel tanks have an increasingly flatter configuration, there are growing problems in integrating conveying units of this type into the fuel tank.

It is known, further, to arrange shaped elements at the bottom of the baffle radially on the outside in the form of a ring, so that they stand up on the bottom of the fuel tank, in order to achieve a filter effect by means of the gaps which are formed between the shaped elements.

The object on which the present invention is based is, therefore, to provide a conveying unit with a baffle which requires as little construction space as possible along the axial extent and which ensures a reliable supply of the fuel to the inlet orifice of the baffle. Furthermore, the baffle of the conveying unit is to have as simple a construction as possible.

BRIEF DESCRIPTION OF THE INVENTION

The object is achieved, according to the invention, in that, on that side of the baffle which faces the tank bottom, ducts are arranged which are designed in such a way that fuel can flow from the circumference of the baffle to the inlet orifice, and in that filter-forming shaped elements are arranged in the ducts.

The baffle of the conveying unit according to the invention thus makes it possible to have filters of relatively flat build which require a particularly small amount of construction space along the axial extent. The ducts on the underside of the baffle ensure that the radially inflowing fuel is in this case led in a controlled manner to the inlet orifice. This ensures a reliable supply of fuel to the inlet orifice, even when the filling level in the fuel tank is low.

In a refinement which is simple to produce, those regions of the bottom of the baffle which form the ducts are designed to be offset inwardly with respect to the remaining regions of the bottom.

A virtually complete emptying of the baffle by means of the fuel pump is ensured by the bottom of the baffle having a planar design on its inside.

According to a further refinement, the production of the baffle by means of injection molding is simplified in that the bottom of the baffle possesses a virtually uniform wall thickness. Pocket formation occurring on the inside of the baffle as a function of the duct configuration is advantageously counteracted by a purposeful arrangement of the suction-intake region of the fuel pump in the largest pocket.

An irregular design of the bottom of the baffle is avoided when the ducts are delimited laterally by upstand elements arranged at the bottom of the baffle. The duct configuration via the upstand element can in this case be implemented particularly simply. A baffle of this type makes it possible for the bottom to have a planar and thin-walled design, with the result that the baffle can be produced particularly cost-effectively. As a result of the low consumption of material, the weight of the baffle is not appreciably increased.

For a sufficient supply of fuel to the inlet orifice, at least two, preferably three or four, ducts are arranged at the bottom of the baffle.

The ducts at the bottom of the baffle may have any desired configuration. In this context, the design of the ducts with a run commencing at the circumference of the baffle and narrowing thereafter has proved advantageous.

For the design of a filter, shaped elements spaced apart from one another are arranged in the radially outer region of the ducts in such a way that gaps occurring between the shaped elements form the throughflow cross section of the filter.

An increase in the degree of filtration by means of a reduction in the gap width, with the throughflow cross section remaining the same, is achieved in that at least one shaped element is not in contact with the tank bottom and the region thereby produced between the end face of the shaped element and the tank bottom is then part of the throughflow cross section of the filter. Furthermore, the shaped elements can be adapted in their geometric dimensions and in the space in between them to the conditions of use prevailing in each case.

Since the inlet region of the ducts cannot have a configuration of any desired size, a sufficient filter effect can be achieved by means of the arrangement of the shaped elements forming the filters in at least two rows lying one behind the other with respect to the radial extent.

DESCRIPTION OF THE DRAWINGS

The invention is described in more detail by means of several exemplary embodiments. In the drawing.

DETAILED DESCRIPTION OF THE INVENTION

Figure 1:
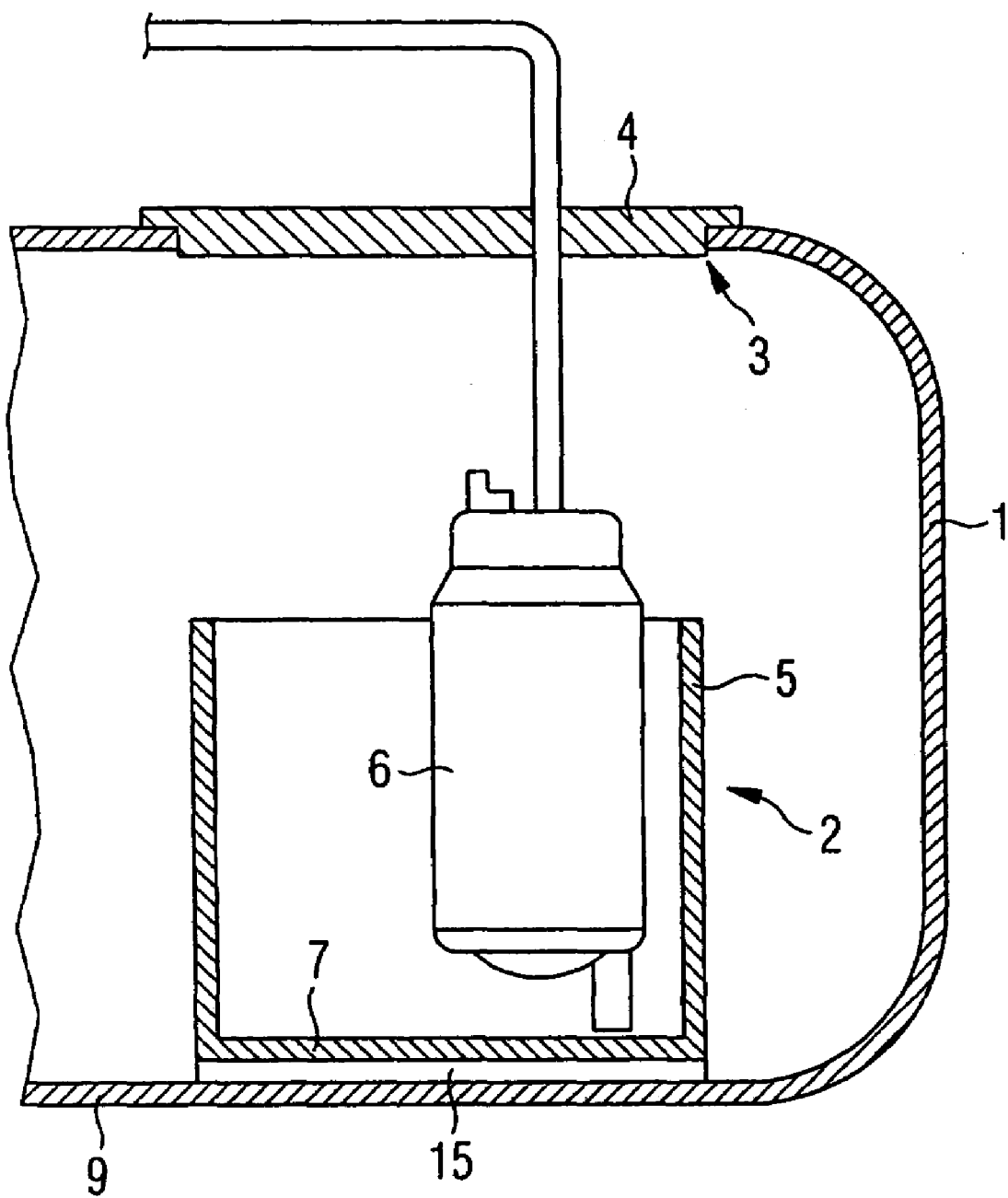
FIG. 1 shows a fuel tank with a conveying unit.

The fuel tank 1 illustrated in FIG. 1 contains a conveying unit 2. The conveying unit 2 is inserted through an orifice 3 of the fuel tank 1, a flange 4 closing the orifice 3 in the fuel tank 1. The conveying unit 2 comprises a baffle 5 for the reception of fuel and a fuel pump 6 which is arranged in said baffle and which conveys the fuel to an internal combustion engine, not illustrated, of the motor vehicle. The conveying unit 2 is seated with the baffle 5 on the tank bottom 9.

Figure 2:
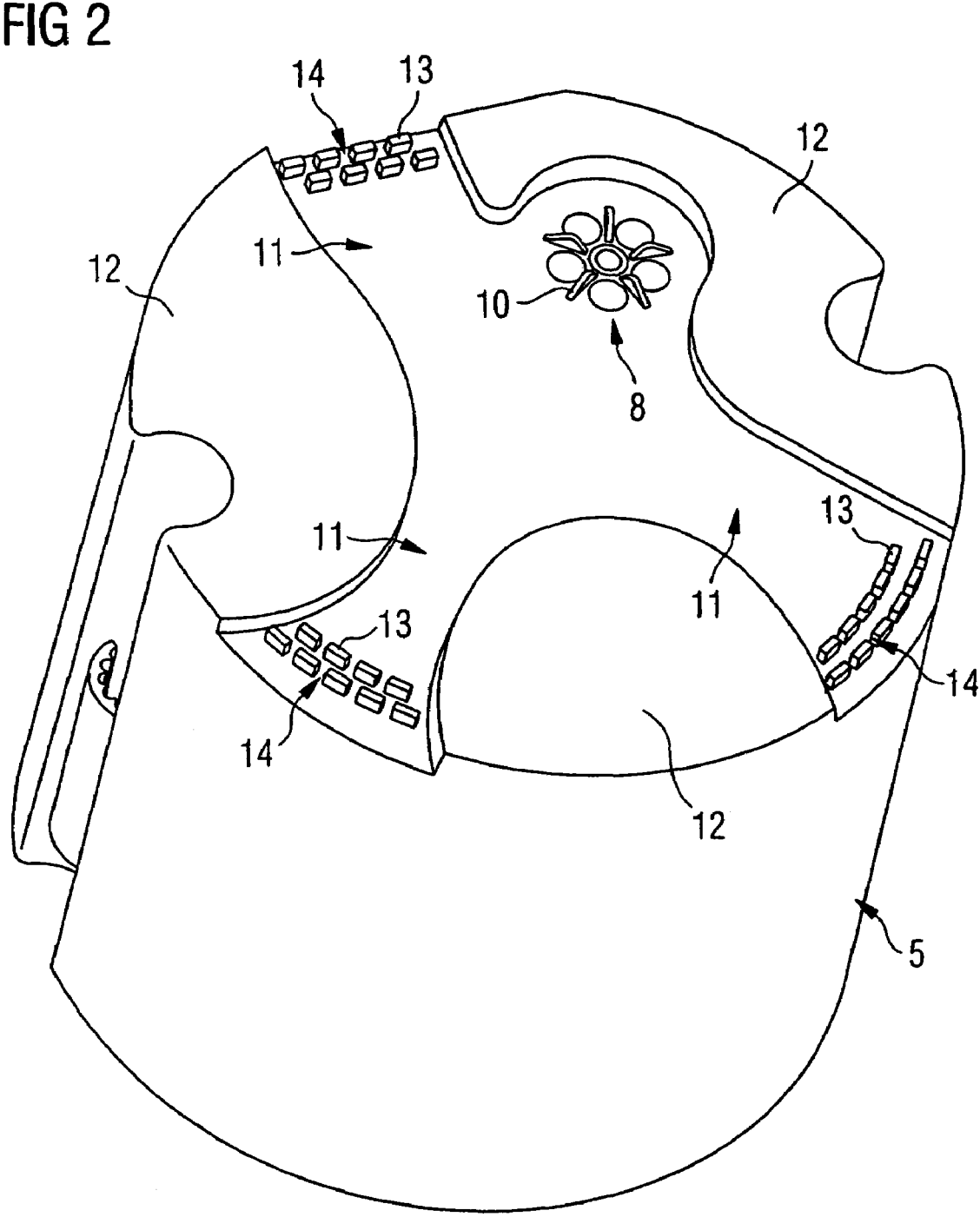
FIG. 2 shows a perspective illustration of the baffle of the conveying unit according to FIG. 1.

FIG. 2 shows the top view of the bottom 7 of the baffle 5 from FIG. 1. The bottom 7 possesses an inlet orifice 8, through which fuel passes out of the fuel tank 1 into the baffle 5. The inlet orifice 8 is provided with spacers 10. In the bottom 7 of the baffle 5, ducts 11 are arranged, which are designed as inwardly offset regions. The ducts 11 run from the radially outer edge of the bottom 7 of the baffle 5 to the inlet orifice 8, said ducts having a narrowing run with respect to the radially outer edge. The baffle 5 stands with the remaining regions 12 on the tank bottom 9. In the radially outer region of each duct 11, shaped elements 13 are arranged, which form a filter 14 in each duct 11, so that, with three ducts 11, there are three filters 14. The fuel present in the fuel tank I flows through the filters 14 and the ducts 11 to the inlet orifice 8, via which it enters the baffle 5.

Figure 3:
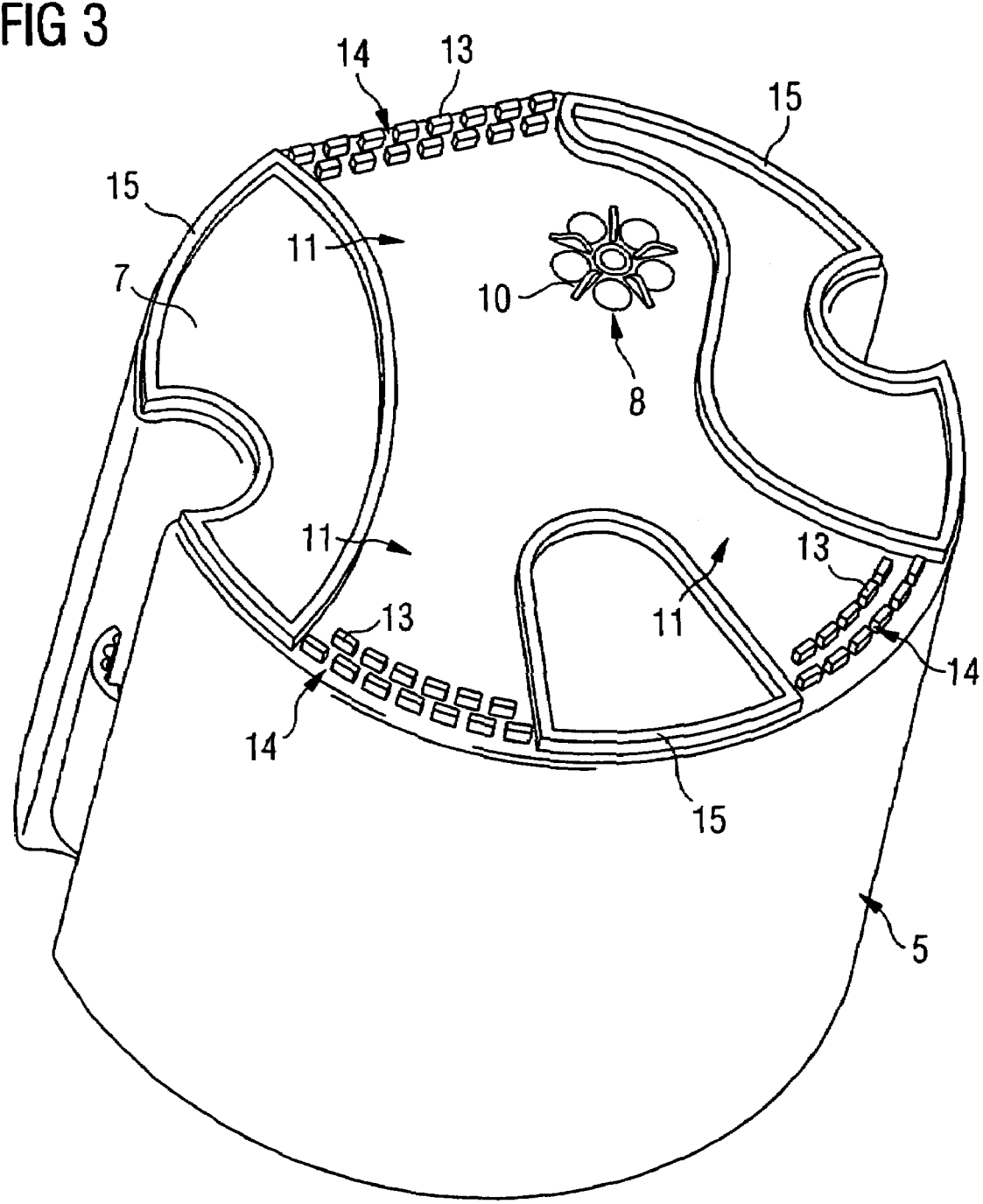
FIG. 3 shows a second embodiment of the baffle according to FIG. 1.

The baffle 5 illustrated in FIG. 3 possesses upstand elements 14 with which it stands on the tank bottom, not illustrated. The upstand elements 15 are in this case 15 designed in such a way that they form lateral boundaries of the ducts 11, via which fuel can flow out of the fuel tank to the inlet orifice 8 and consequently to the baffle 5. Shaped elements 13 arranged in the region of the radially outer edge of the ducts 11 form a filter 14 in each duct 11, so that the particles located in the fuel do not pass into the baffle 5 and consequently into the suction-intake region of the fuel pump.

Figure 4:
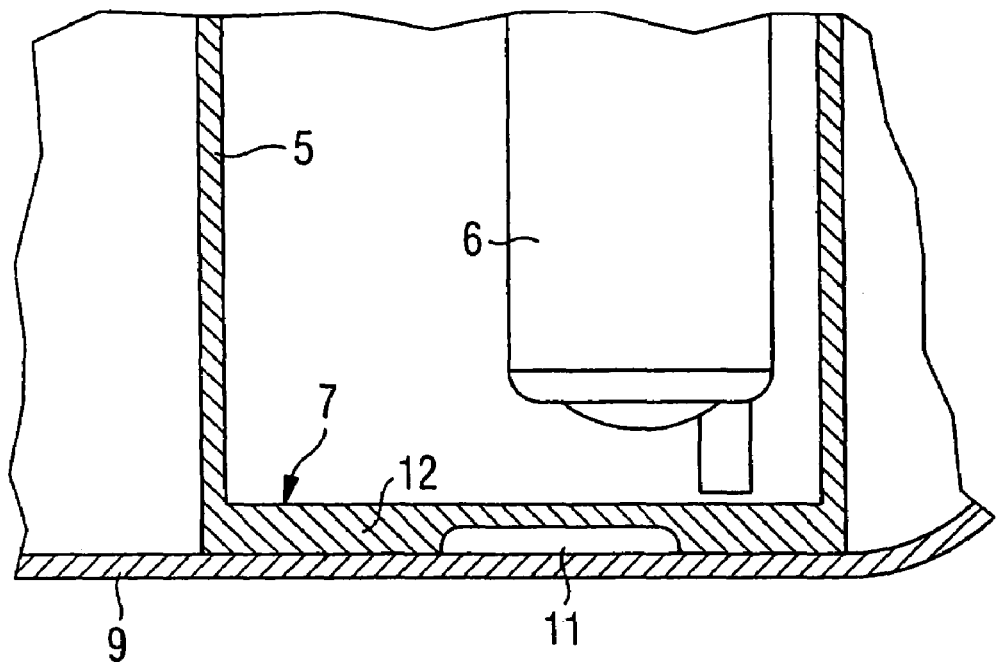
FIGS. 4 and 5 show in each case an embodiment of the baffle according to FIG. 3 in section.
Figure 5:
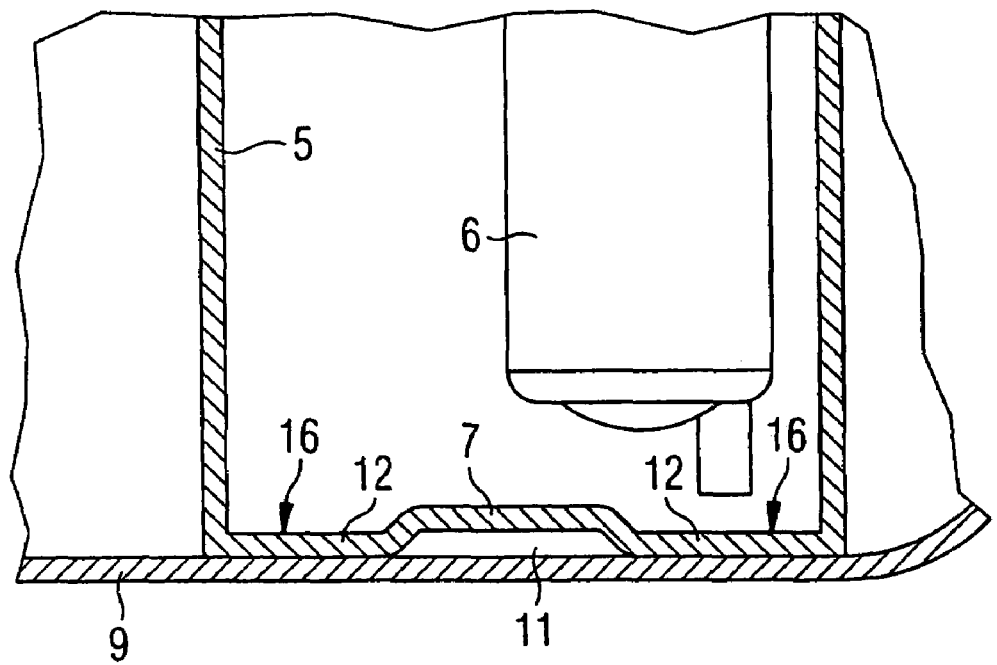

The baffle 5 in FIG. 4 possesses a bottom 7 in which the ducts 11 are designed as inwardly offset regions. Within the baffle 5, the bottom 7 has a planar design. As a result, in the regions 12 with which the baffle 5 is seated on the tank bottom, the bottom 7 possesses a greater wall thickness than in the region of the ducts 11. The ducts 11 in the baffle 5 according to FIG. 5 are likewise designed as inwardly offset regions.

The bottom 7 of the baffle 5 possesses approximately the same wall thickness in all regions, so that, inside the baffle 5, the ducts 11 are formed as elevations and the regions 12 as pockets 16. The size of the pockets 16 can be influenced by means of a purposeful configuration of the ducts 11. The fuel pump 6 is arranged with its suction-intake region in the largest pocket 16.

What is claimed is:

1. A conveying unit with a baffle, with a fuel pump arranged therein and with a filter which is arranged at the bottom of the baffle and which precedes an inlet orifice arranged in the bottom of the baffle, characterized in that, on that side of the baffle (5) which faces a tank bottom (9), ducts (11) are arranged, which are designed in such a way that fuel can flow from a circumference of the baffle (5) to the inlet orifice (8), and in that shaped elements (13) forming filters (14) are arranged in the ducts (11).

2. The conveying unit as claimed in claim 1, characterized in that those regions of the bottom (7) of the baffle (5) which form the ducts (11) are designed to be offset inwardly with respect to the remaining regions (12) of the bottom (7).

3. The conveying unit as claimed in claim 2, characterized in that the bottom (7) of the baffle (5) possesses a virtually uniform wall thickness.

4. The conveying unit as claimed in claim 2, characterized in that the bottom (7) of the baffle (5) has a planar design on its inside.

5. The conveying unit as claimed in claim 3, characterized in that the fuel pump (6) is arranged in such a way that it sucks in fuel from a pocket (16) of the bottom (7) of the baffle (5), the pocket (16) corresponding to a region (12) having a greater axial extent.

6. The conveying unit as claimed in claim 1, characterized in that the ducts are delimited laterally by upstand elements (15) arranged at the bottom (7) of the baffle (5).

7. The conveying unit as defined in claim 1, characterized in that at least two ducts (11) are arranged at the bottom (7) of the baffle (5).

8. The conveying unit as defined in claim 1, characterized in that the ducts (11) are designed, commencing at the circumference of the baffle (5), with an initially narrowing run.

9. The conveying unit as defined in claim 1, characterized in that shaped elements (13) are spaced apart from one another and are arranged in the radially outer region of the ducts (11) in such a way that the gaps occurring between the shaped elements (13) form the throughflow cross section of a filter (14).

10. The conveying unit as claimed in claim 9, characterized in that at least one shaped element (13) is not in contact with the tank bottom and the region thereby produced between the end face of the shaped element (13) and the tank bottom (9) is part of the throughflow cross section of the filter (14).

11. The conveying unit as claimed in claim 9 or 10, characterized in that the shaped elements (13) are arranged in at least two rows lying one behind the other along the radial extent.

* * * * *